(12) United States Patent
Pandya (10) Patent No.: US 8,352,442 B2
(45) Date of Patent: Jan. 8, 2013

(54) DETERMINATION OF AN UPDATED DATA SOURCE FROM DISPARATE DATA SOURCES

(75) Inventor: Saurabh Pandya, Wales (GB)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 12/239,926

(22) Filed: Sep. 29, 2008

(65) Prior Publication Data

US 2010/0036892 A1 Feb. 11, 2010

(30) Foreign Application Priority Data

Aug. 8, 2008 (EP) .................................. 08162070

(51) Int. Cl.
*G06F 7/00* (2006.01)
(52) U.S. Cl. ........................ 707/694; 709/201
(58) Field of Classification Search ................ 707/694, 707/655; 709/201
See application file for complete search history.

(56) References Cited

U.S. PATENT DOCUMENTS

| | | | |
|---|---|---|---|
| 5,276,458 A | 1/1994 | Sawdon | |
| 7,797,293 B2 * | 9/2010 | Pabla et al. | 707/705 |
| 7,899,792 B2 * | 3/2011 | Wakiyama et al. | 707/655 |
| 7,908,647 B1 * | 3/2011 | Polis et al. | 726/5 |
| 2002/0062241 A1 * | 5/2002 | Rubio et al. | 705/10 |
| 2003/0212712 A1 * | 11/2003 | Gu et al. | 707/200 |
| 2006/0069697 A1 | 3/2006 | Shraim et al. | |
| 2006/0186309 A1 | 8/2006 | Lonnqvist | |
| 2006/0195422 A1 * | 8/2006 | Cadiz et al. | 707/3 |
| 2006/0195472 A1 * | 8/2006 | Cadiz et al. | 707/104.1 |
| 2006/0218630 A1 | 9/2006 | Pearson et al. | |
| 2007/0027930 A1 * | 2/2007 | Alvarado et al. | 707/200 |
| 2007/0150603 A1 | 6/2007 | Crull et al. | |
| 2007/0255916 A1 * | 11/2007 | Hiraiwa et al. | 711/162 |
| 2008/0168539 A1 | 7/2008 | Stein | |
| 2009/0292745 A1 * | 11/2009 | Bose et al. | 707/204 |
| 2009/0300139 A1 * | 12/2009 | Shoemaker et al. | 709/217 |
| 2010/0036853 A1 | 2/2010 | Jones | |
| 2010/0037301 A1 | 2/2010 | Jones | |

OTHER PUBLICATIONS

U.S. Appl. No. 12/238,676, filed Sep. 26, 2008.
U.S. Appl. No. 12/239,853, filed Sep. 29, 2008.

(Continued)

*Primary Examiner* — Pierre Vital
*Assistant Examiner* — Christopher J Raab
(74) *Attorney, Agent, or Firm* — Schmeiser, Olsen & Watts; John Pivnichny (57) ABSTRACT

A method and system for determining an updated data source from first and second disparate data sources. A first and second data list is received from the first and second data sources, respectively. The data elements in the first data list matching data elements in the second data list are written to a first aggregation data list. The data elements in the first data list not matching data elements in the second data list are written to an additions data list. The data elements in the second data list not matching data elements in the first data list are written to a first deletions data list. All data elements in the first aggregation data list and the additions data list are written into a second aggregation data list. All data elements matching the data elements in the first deletions data list are written into a second deletions data list.

20 Claims, 8 Drawing Sheets

OTHER PUBLICATIONS

Austel P et al.; Secure Delegation for Web 2.0 and Mashups; Internet Citation, May 22, 2008; pp. 1-7, XP007910307; Retrieved from the Internet: <URL: http://w2spconf.com/2008/papers/sp4.pdf > [retrieved on Oct. 26, 2009] abstract Section "Introduction, p. 1-2, par 1-3 "Delegation Using OAuth"; p. 3"Programming Model; p. 3 figure 1.

Mark Atwood et al.; OAuth Core 1.0; Internet Citation, Dec. 4, 2007; XP007910182; Retrieved from the Internet: <URL: http://oauth.net/core/1.0> [retrieved on Oct. 15, 2009] Section 6-7, p. 7-12.

Final Office Action (Mail Date Mar. 13, 2012) for U.S. Appl. No. 12/239,853, filed Sep. 29, 2008.

Office Action (Mail Date Oct. 13, 2011) for U.S. Appl. No. 12/239,853, filed Sep. 29, 2008.

Amendment filed Jan. 10, 2012 in response to Office Action (Mail Date Oct. 13, 2011) for U.S. Appl. No. 12/239,853, filed Sep. 29, 2008.

Amendment filed May 24, 2012 in response to Final Office Action (Mail Date Mar. 13, 2012) for U.S. Appl. No. 12/239,853, filed Sep. 29, 2008.

Notice of Allowance (Mail Date Jun. 28, 2012) for U.S. Appl. No. 12/239,853, filed Sep. 29, 2008.

Office Action (Mail Date Jun. 15, 2012) for U.S. Appl. No. 12/238,676, filed Sep. 26, 2008.

Joy's Production Services; Multi Projector Widescreen [online]; 2008; [retrieved on Jul. 26, 2012]; retrieved from the Internet: <URL: http://www.joys.com/widescreen/multi_projector.shtml>; 1 page.

* cited by examiner

DETERMINATION OF AN UPDATED DATA SOURCE FROM DISPARATE DATA SOURCES

FIELD OF THE INVENTION

The invention relates to determining an updated data source from a set of disparate data sources such as in a social networking application.

BACKGROUND OF THE INVENTION

Social networking applications such as Facebook®, MySpace®, and Bebo®, etc, all store information about people. Information is stored via means of a person's social network contact list. A contact list is a list of people that a person 'knows' and hence wishes to interact with via the social networking application.

A problem may occur when a third party developed application (i.e. one not provided by the social networking application that is to be interacted with) needs to interact with one or more social networking applications in order to provide a service, because it is not always possible for the third party application to obtain all of the information that is required to provide its service. have the same list of contacts as the contact list stored by the social networking application.

SUMMARY OF THE INVENTION

The present invention provides a method for determining an updated data source from a first disparate data source and a second disparate data source in a data processing system, said method comprising:

receiving into a volatile memory a first data list and a second data list associated with the first disparate data source and the second disparate data source, respectively;

determining all data elements in the first data list that match data elements in the second data list;

writing into a first aggregation data list in the volatile memory said determined all data elements in the first data list that match data elements in the second data list;

determining all data elements in the first data list that do not match data elements in the second data list;

writing into an additions data list in said volatile memory said determined all data elements in the first data list that do not match data elements in the second data list;

determining all data elements in the second data list that do not match data elements in the first data list;

writing into a first deletions data list in said volatile memory said determined all data elements in the second data list that do not match data elements in the first data list;

after said writing into the first aggregation data list, said writing into the additions data list, and said writing into the first deletions data list: writing to a second aggregation data list in a non-volatile memory of a data store all data elements in the first aggregation data list and all data elements in the additions data list; and after said writing into the first deletions data list, removing from a second deletions data list stored in the non-volatile memory of the data store all data elements matching the data elements in the first deletions data list.

The present invention provides a computer system comprising a processor and a computer readable storage medium, said storage medium containing program code configured to be executed by the processor to implement a method for determining an updated data source from a first disparate data source and a second disparate data source in a data processing system, said method comprising:

receiving into a volatile memory a first data list and a second data list associated with the first disparate data source and the second disparate data source, respectively;

determining all data elements in the first data list that match data elements in the second data list;

writing into a first aggregation data list in the volatile memory said determined all data elements in the first data list that match data elements in the second data list;

determining all data elements in the first data list that do not match data elements in the second data list;

writing into an additions data list in said volatile memory said determined all data elements in the first data list that do not match data elements in the second data list;

determining all data elements in the second data list that do not match data elements in the first data list;

writing into a first deletions data list in said volatile memory said determined all data elements in the second data list that do not match data elements in the first data list;

after said writing into the first aggregation data list, said writing into the additions data list, and said writing into the first deletions data list: writing to a second aggregation data list in a non-volatile memory of a data store all data elements in the first aggregation data list and all data elements in the additions data list; and after said writing into the first deletions data list, removing from a second deletions data list stored in the non-volatile memory of the data store. all data elements matching the data elements in the first deletions data list.

The present invention provides a computer program product, comprising a computer readable storage medium having a computer readable program code therein, said computer readable program code comprising an algorithm configured to implement a method for determining an updated data source from a first disparate data source and a second disparate data source in a data processing system, said method comprising:

receiving into a volatile memory a first data list and a second data list associated with the first disparate data source and the second disparate data source, respectively;

determining all data elements in the first data list that match data elements in the second data list;

writing into a first aggregation data list in the volatile memory said determined all data elements in the first data list that match data elements in the second data list;

determining all data elements in the first data list that do not match data elements in the second data list;

writing into an additions data list in said volatile memory said determined all data elements in the first data list that do not match data elements in the second data list;

determining all data elements in the second data list that do not match data elements in the first data list;

writing into a first deletions data list in said volatile memory said determined all data elements in the second data list that do not match data elements in the first data list;

after said writing into the first aggregation data list, said writing into the additions data list, and said writing into the first deletions data list: writing to a second aggregation data list in a non-volatile memory of a data store all data elements in the first aggregation data list and all data elements in the additions data list; and after said writing into the first deletions data list, removing from a second deletions data list stored in the non-volatile memory of the data store. all data elements matching the data elements in the first deletions data list.

BRIEF DESCRIPTION OF THE DRAWINGS

Embodiments of the invention are described below in detail, by way of example only, with reference to the accompanying drawings.

DETAILED DESCRIPTION OF THE INVENTION

Viewed from a first aspect, the present invention provides an apparatus for determining an updated data source from a first and second disparate data source in a data processing system; the apparatus comprising: a get data list component for receiving a first data list and a second data list associated with the first and second data source respectively; a parsing component for identifying whether a data element in the first data list matches a data element in the second data list and responsive to a matching data element being identified, a writing component writing the data element to an aggregation data list; a parsing component for identifying whether a data element in the first data list can not be identified in the second data list and responsive to a data element not being identified in the second data list, a writing component writing the data element to an additions data list; a parsing component for identifying whether a data element in the second data list can not be identified in the first data list and in response to a data element not being identified in the first data list, a writing component writing the data element to a deletion list; and a write component for writing the data element associated with the addition list to the aggregation list and a removal component for removing the data elements from the deletions list.

Advantageously, the present invention provides a more efficient processing algorithm compared to traditional merging. This is achieved by keeping five data lists (additions, deletions, third party application list, social network list and aggregated list) in volatile memory. This is high on memory usage but low in the number of operations used to achieve the aggregated list. Further, once a data element is compared the data element is not compared in subsequent operations as would be done in a traditional merge approach where every item is compared multiple times because no reference to previously compared items is kept (this is the additions, deletions and aggregated list that keep these references). In processing and speed terms the aggregation component advantageously provides that when the number of data elements in a data list increases there is a linear increase in memory usage. Traditional merging results in a linear increase in memory usage, but exponential increase in number of comparison operations.

Advantageously, the present invention allows for different data being stored in different contact lists to be aggregated into one list, in volatile memory, without having to permanently store the data from, for example, the data from the social network application.

In one embodiment, the present invention provides an apparatus wherein the get data list component, the parsing component and the write component are operable for performing operations in volatile memory.

In one embodiment, the present invention provides an apparatus wherein the writing of the data elements associated with the addition list to the aggregation list is operable for performing write operations in non-volatile memory.

In one embodiment, the present invention provides an apparatus wherein a matching data element is a data element that is identified as being identical to the data element in which it is being compared with.

In one embodiment, the present invention provides an apparatus wherein the first and second data lists are lists of a user's contact.

In one embodiment, the present invention provides an apparatus wherein the first and second data lists are associated with a first and second social networking application;

In one embodiment, the present invention provides an apparatus wherein a data element comprises a name of a person, a telephone number or an email address.

In one embodiment, the present invention provides apparatus further comprises a parsing component identifying whether any supplementary data is associated with a data element in the first data list and whether any supplementary data is associated with a data element in the second data list and responsive to identifying, means for determining whether the identified supplementary data of the first data list is identical to the identified supplementary data of the second data list and responsive to means for determining, aggregating means for aggregating the supplementary data of the second data list with the supplementary data of the first data list.

Viewed from a second aspect, the present invention provides a method for determining an updated data source from a first and second disparate data source in a data processing system; the method comprising the steps of: receiving a first data list and a second data list associated with the first and second data source respectively; identifying whether a data element in the first data list matches a data element in the second data list and responsive to a matching data element being identified, writing the data element to an aggregation data list; identifying whether a data element in the first data list can not be identified in the second data list and responsive to a data element not being identified in the second data list, writing the data element to an additions data list; identifying whether a data element in the second data list cannot be identified in the first data list and in response to a data element not being identified in the first data list, writing the data element to a deletion list; and writing the data element associated with the addition list to the aggregation list and removing the data elements from the deletions list.

In one embodiment, the present invention provides a method wherein all the method steps of claim 1 are operable for performing operations in volatile memory.

In one embodiment, the present invention provides a method wherein the writing of the data elements associated with the addition list to the aggregation list is operable for performing write operations in non-volatile memory.

In one embodiment, the present invention provides a method wherein a matching data element is a data element that is identified as being identical to the data element in which it is being compared with.

In one embodiment, the present invention provides a method wherein the first and second data lists are lists of a user's contact.

In one embodiment, the present invention provides a method wherein the first and second data lists are associated with a first and second social networking application;

In one embodiment, the present invention provides a method wherein a data element comprises a name of a person, a telephone number or an email address.

In one embodiment, the present invention provides a method further comprises identifying whether any supplementary data is associated with a data element in the first data list and whether any supplementary data is associated with a data element in the second data list and responsive to identifying, determining whether the identified supplementary data of the first data list is identical to the identified supplementary data of the second data list and responsive the step of determining, aggregating the supplementary data of the second data list with the supplementary data of the first data list.

Viewed from a third aspect, the present invention comprises a computer program product loadable into the internal memory of a digital computer, comprising software code portions for performing, when said product is run on a computer, to carry out the invention as described above.

Figure 1:
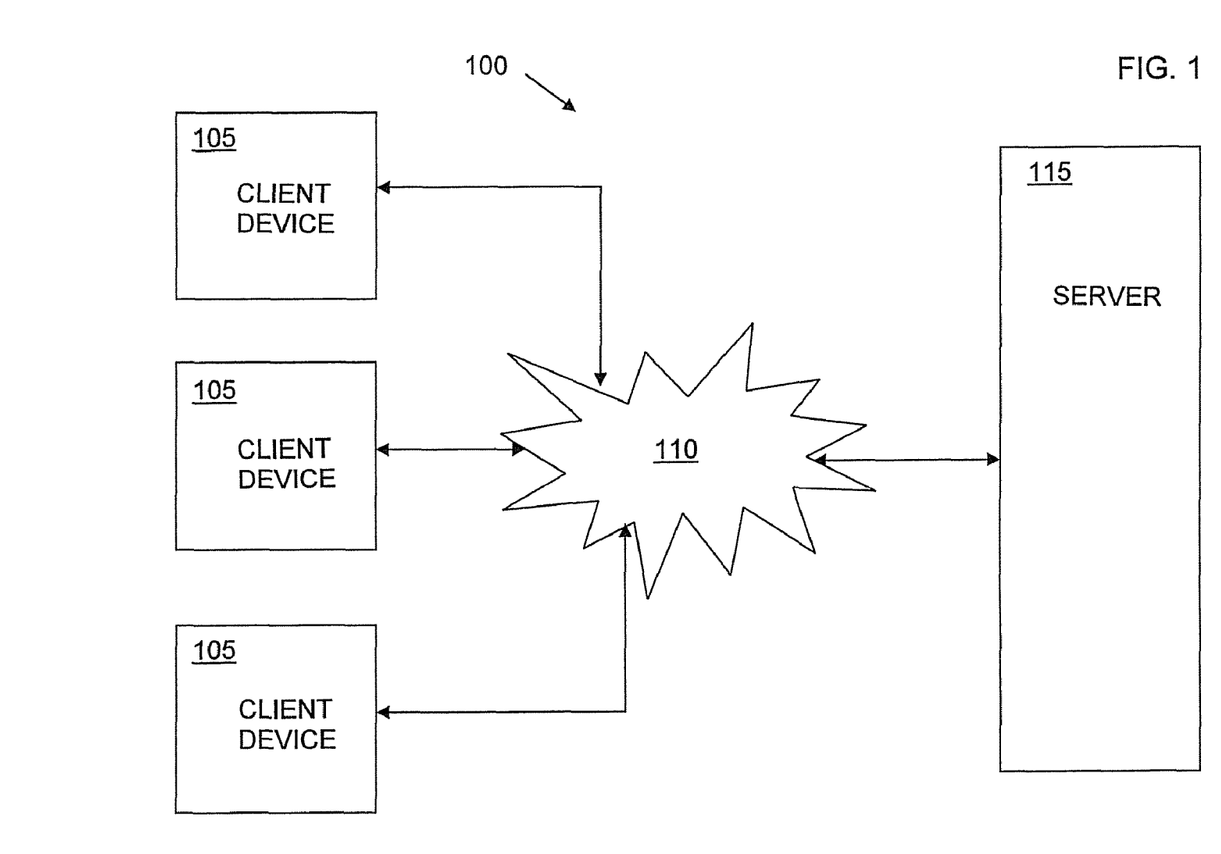
FIG. 1 is a block diagram of a data processing system in which the present invention may be embodied, in accordance with embodiments of the present invention.

FIG. 1 is a block diagram showing the components of a typical data processing system 100 in which the present invention may be embodied. The data processing system 100 typically comprises a plurality of client devices 105 operable for connecting to a plurality of servers 115 across a network 110. A client device 105 can tale the form of a computer, a mobile phone or a PDA etc. A client device 105 typically comprises a web browser which is operable for sending requests for resources across the network 110 to the appropriate server 115. A request for a resource may be a request for a web page or to access a download page to download resources such as music files etc. The server 115 stores resources which can be accessed via a plurality of client devices. The server 115 runs web server technology in order to server resources to requesting client devices.

Figure 2:
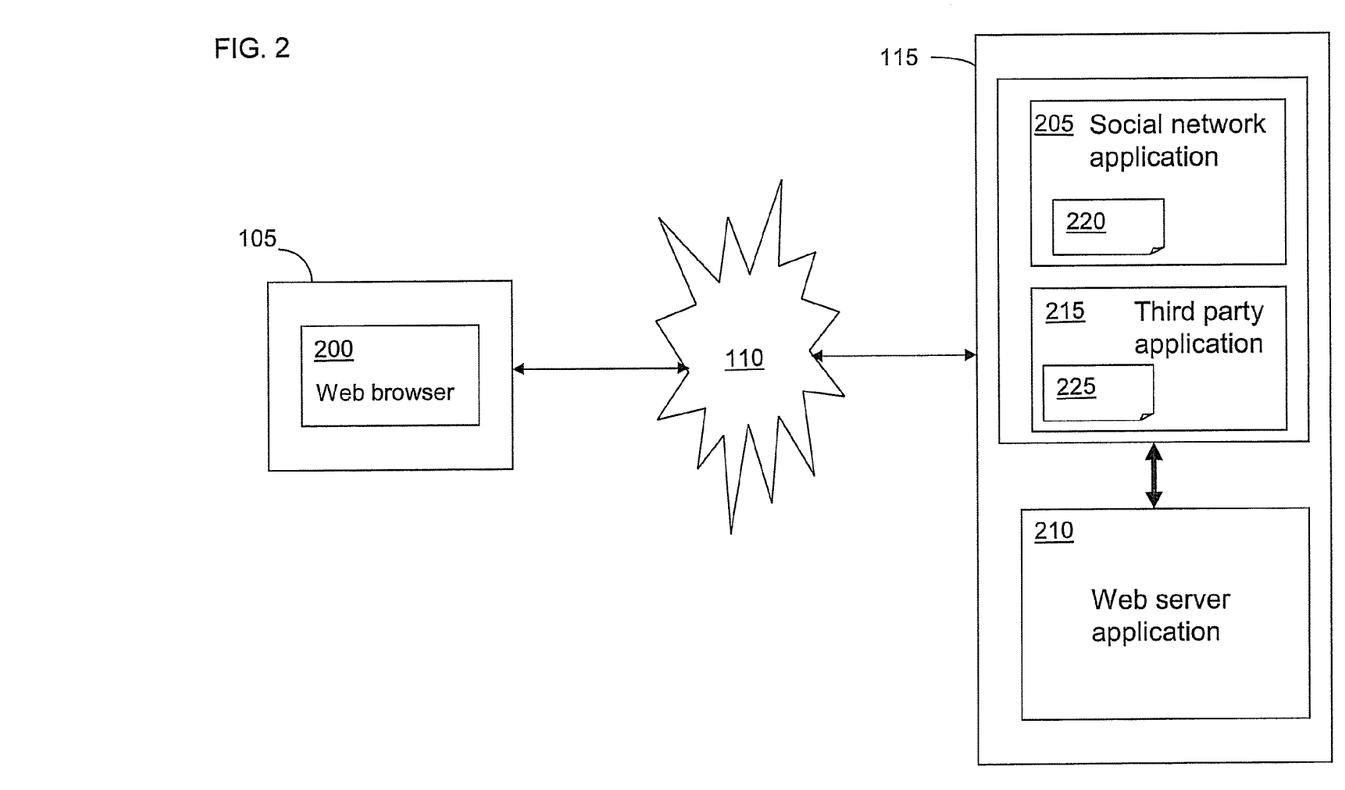
FIG. 2 is a block diagram of a web browsing application interacting with a first social networking application, in accordance with embodiments of the present invention.

FIG. 2 is block diagram detailing a client device 105 running a web browser application 200 which is requesting a resource from the server 115. In this example, the server 115 is running a number of social networking applications 205. A social networking application 205 in this example comprises a means in which a user can register a number of friends, add these friends to a contact list and interacts with the friends via, for example, an integrated messaging application, conferencing facilities of other events and applications that are accessible via the social networking application.

When a user of a client device 105 wishes to access a social networking application 205, typically, the user would type in the URL of the social networking application 205, or if the location of the social networking application 205 is bookmarked in the web browser tool bar, selecting the bookmark from the browser tool bar.

The request to access the social networking application 205 is transmitted from client device 105 across the network 110 to the web server 210. The web server 210 transmits back to the requesting client device 105 the requested resource. In this example, the requested resource will be the log in page of the social networking application 205. Typically, a user is required to log into the social networking application 205 via a user ID and password. Then, once authenticated with the social networking application 205, the social networking application 205 displays the user's home page. Typically, the homepage comprises a list of the user's contacts 220 along with other applications that the user may have 'added to' their homepage. The list of user's friends 220 may comprise the name of the friend along with a picture associated with that friend.

Located on the user's homepage there may be a list of applications that the user can access and use with the social networking application 205. By 'use with' it is meant that the application is operable for use with the social networking application 205 and is launched within the social networking application 205 itself. In one embodiment, these applications are developed by a third party and are not developed by the developers of the social networking application 205. For clarity these types of applications will be known as third party applications 215. In order for a third party application 215 to be operable with the social networking application 205, the third party application 215 is often required to access information held by the social networking application 205; for example, the list of user's contacts 220. However, because of terms and conditions associated with the social networking application 205, it is not always possible to store information that the social networking application 205 holds. Also, if a user first logs in and registers friends with the third party application 215 and subsequently logs in to the social networking application 205 the friends contact list 220, 225 from the social networking application 205 and the third party application 215 may not match. This may be because contacts have been added or deleted from one contact list 220, 225 and not the other.

In accordance with a preferred embodiment of the present invention an improved data aggregation component is provided. The function of the aggregation component is to aggregate and analyze a plurality of disparate data sources in order to determine, in an efficient manner, an up to date and current data source for the user's session with both the third party application 215 and the social networking application 205. The analysis and aggregation functions are performed in memory and only a final aggregation list is written to storage.

Figure 3:
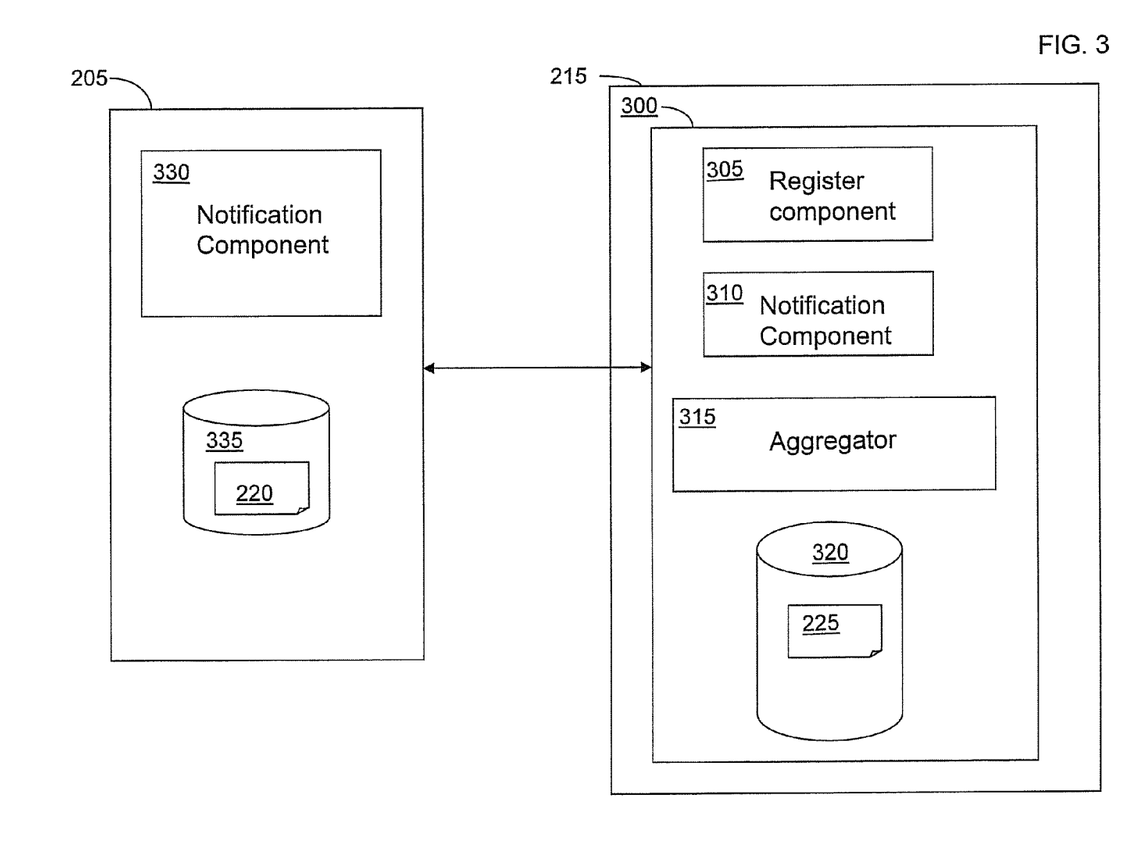
FIG. 3 is a block diagram showing the components of an aggregation component, in accordance with embodiments of the present invention.

FIG. 3 shows the components of the aggregation component 300, in accordance with embodiments of the present invention. These comprise a register component 305, a notification component 310, an aggregator component 315, and a data store component 320 having an aggregated contact list 220, 225. Each of these components interfaces and interacts with each other in order to provide the function as explained above. Each of these components will now be explained in turn.

The register component 305 allows a user to register their personal details with the third party application 215. These personal details may comprise the user ID and password that the user has registered with the social networking application 205, email address of the user and a telephone number of the user etc.

Once the user has been granted access to the third party application 215, the user is then able to customize how they use the third party application 215 and set up their list of contacts 225. However, a user in a preferred embodiment of the third party application 215 may use the third party application as a 'broker' in order to access the contact lists of various social network applications 205 that the user has registered with. Thus when logging onto the third party application 215, the third party application 215 goes and 'fetches' the contact lists 220 from each of the social network applications 205 that it is registered with.

When a user requests access to the third party application 215 via the social networking application 205, the notification component 310 receives a notification from the notification component 330 of the social networking application 205 that a user has requested access to the third party application 215 via the social networking application 205. The data received by the notification component 310 comprises the user's unique ID and the user is given access to the third party application 215 via the social networking application 205.

The aggregator 315 receives a trigger from the notification component 310 that a user has requested access to the third party application 215. At this point, the aggregator component 315 transmits a request to the data store 320 requesting access to the contact list 225 associated with the received unique ID, stored by the third party application 215 and sends a further request to the data store 335 associated with the social networking application for access to the contact list 220 associated with the received unique ID. Lastly, the aggregator component 315 writes to the data store 320 an aggregated contact list which forms the basis of the starting point for further analysis of the aggregated contact list and the contact list 220 stored by the social networking application 205 when the user subsequently logs into the third party application 205 at a later point in time; i.e., a new session for the third party application 205 is created.

Figure 4:
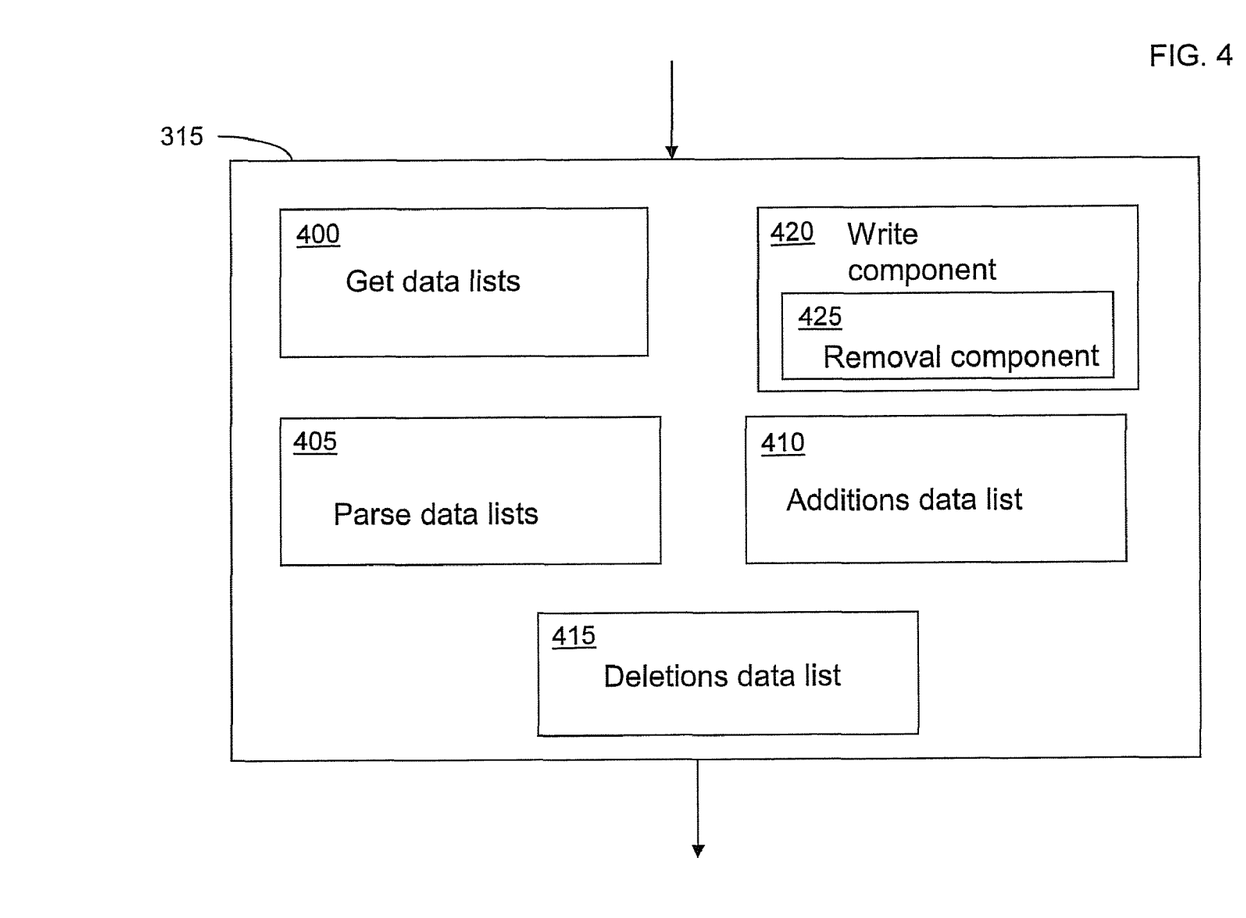
FIG. 4 is a block diagram detailing the sub components of get current state component of the aggregation component of FIG. 3, in accordance with embodiments of the present invention.

In FIG. 4, the sub components of the aggregator component 315 are a get data list component 400, a parse data list component 405, a write component 420, an addition data list component 410, and a deletions data list component 415. The write component 420 comprises a removal component 425. Firstly, the aggregator component 315 requests access to the contact lists 220, 225 held by the social networking application 205 and the third party application 215. Once received the aggregator component 315 then holds in memory (volatile memory) a representation of the two lists 220, 225.

Figure 5:
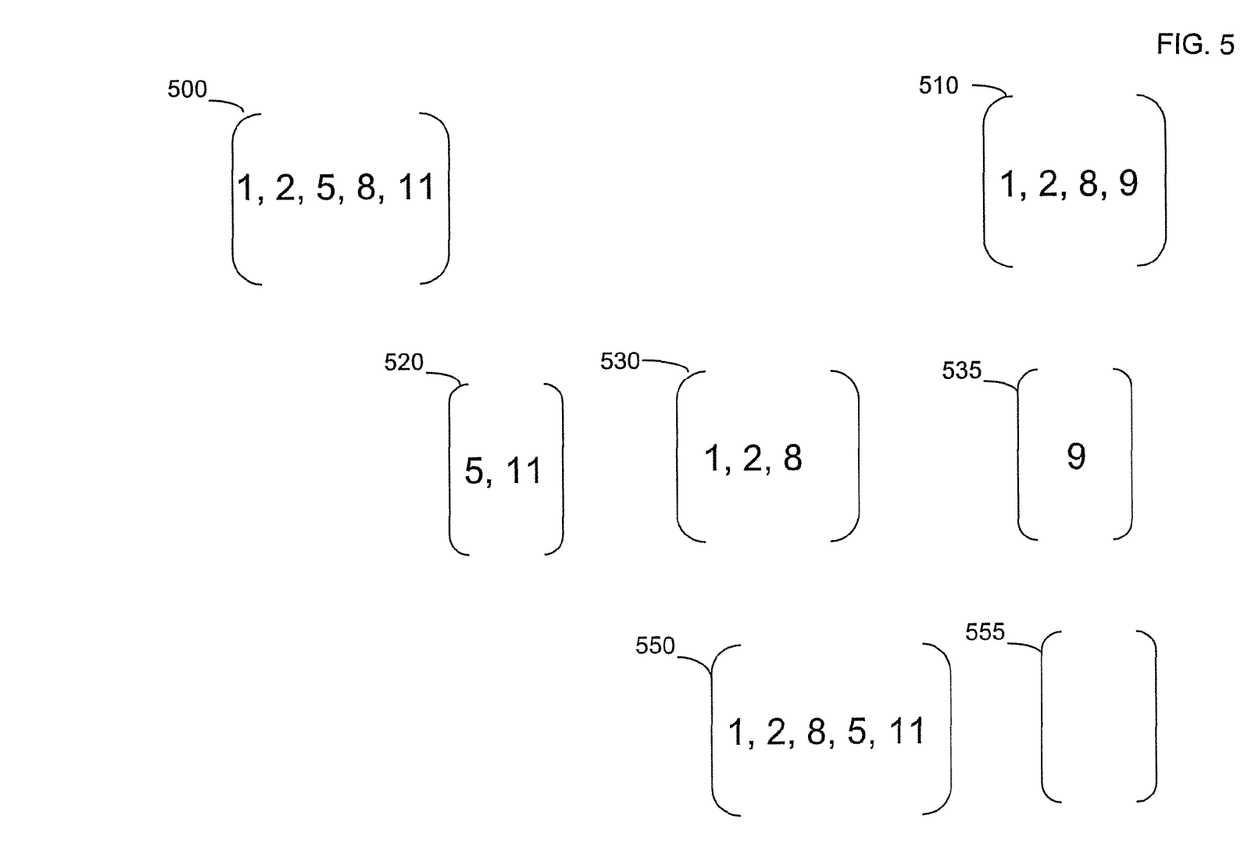
FIG. 5 is a diagram detailing a number of data sets in order to illustrate the process steps of the aggregation component in accordance with FIGS. 3 and 4, in accordance with embodiments of the present invention.

A simplistic example is shown in FIG. 5 where the data list 500 comprises the data elements 1, 2, 5, 8 and 11; this list represents the contact list 220 obtained from the social networking application 205. Each data element in the data list 500 represents a name in the contact list 220 and any other supplementary information associated with the name. For example, email address, telephone number, preferred contact details etc.

The second data list 510 comprises the data elements 1, 2, 8, 9 this data list 510 represents the contact list 225 currently stored by the third party application 215. It can be seen from these two data lists 500, 510 that some of the data elements of the first data list 500 do not match (are not identical) the data elements in the second data list 510, for example, data element 5 of the first data list 500 is not listed in the second data list 510 and the data element 9 of the second data list 510 is not listed in the first data list 500.

The parse data list component 405 parses each data list 500, 510 starting with the second data list 510 of the third party application 215 (the second list 510). The parse data list component 405 begins with the first element in the data list 510 and compares this element to each data element in the first data list 500. If a matching data element is located, the parse data list component 405 aggregates any supplementary information received from the social networking application 205 and any supplementary information also stored by the third party application into an aggregated list data list 530. For example, the first data list 500 may store an email address for John Smith. However, the second data list may store a telephone number for John Smith thus both sets of information are aggregated such that for John Smith a telephone number and email address is stored.

Each time the parse data list component 405 locates a matching data element, the matching data element is removed from the first and second data lists 500, 510 to prevent further processing. This is shown again with reference to FIG. 5, where it is shown that data elements 1, 2, and 8 are common between the first and second data lists 500, 510. These data elements are held in aggregated data list 530.

Next, the parse data lists component 405 identifies any data elements in the first list 500 that are not stored in the second list 510. If a data element is found these data elements are added to an additions data list. Again with reference to FIG. 5 this is shown with respect to additions data list 520, where data elements 5 and 11 have been identified as located in the first data list 500 but not in the data list 510.

Lastly, the parse data lists component 405 identifies the data elements which are located in the second data list 510 but not in the first data list 500. If any of these data elements are located these data elements are added to a deletions data list 535.

Figure 6A:
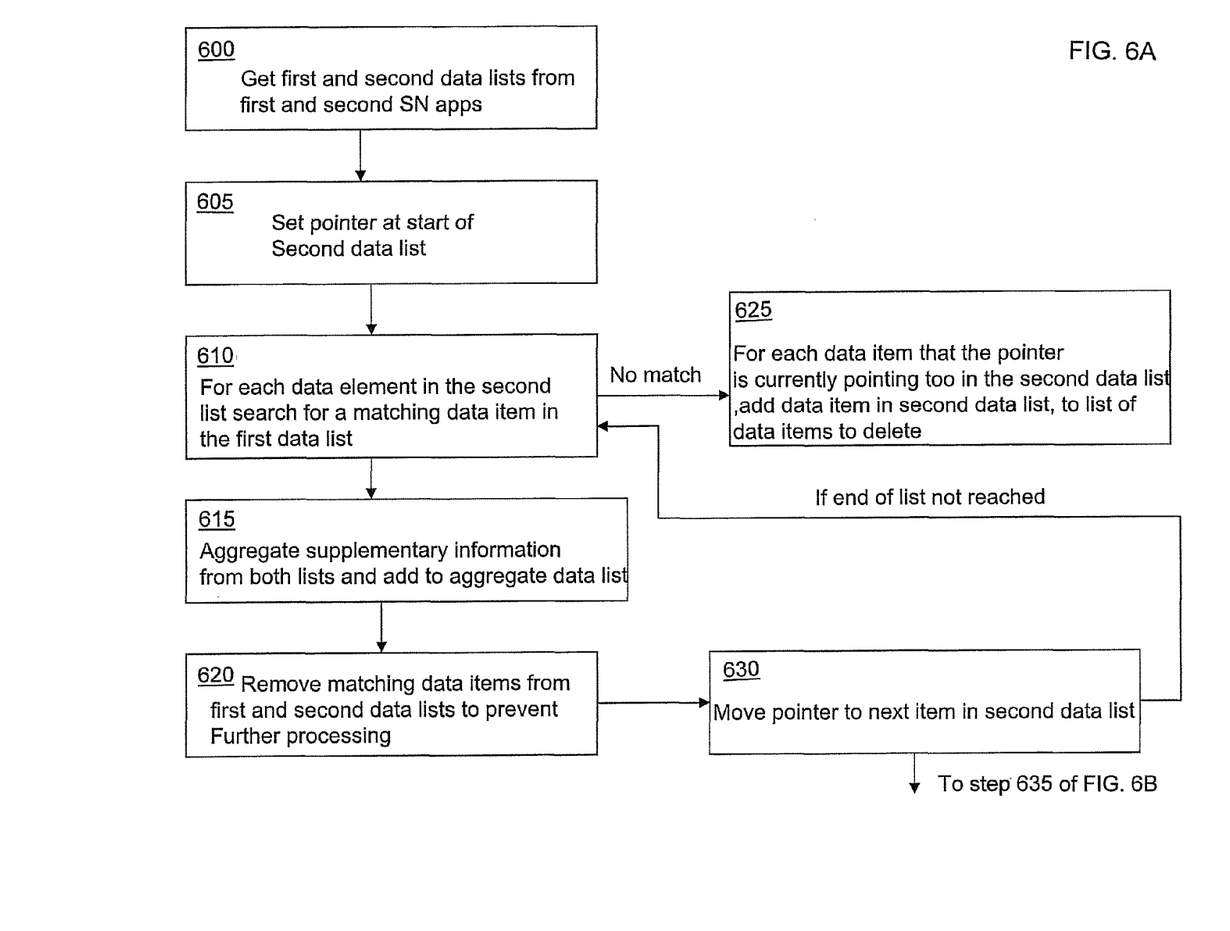
FIGS. 6A and 6B are a flow chart showing the process steps of the aggregation component of FIGS. 3 and 4, in accordance with embodiments of the present invention.
Figure 6B:
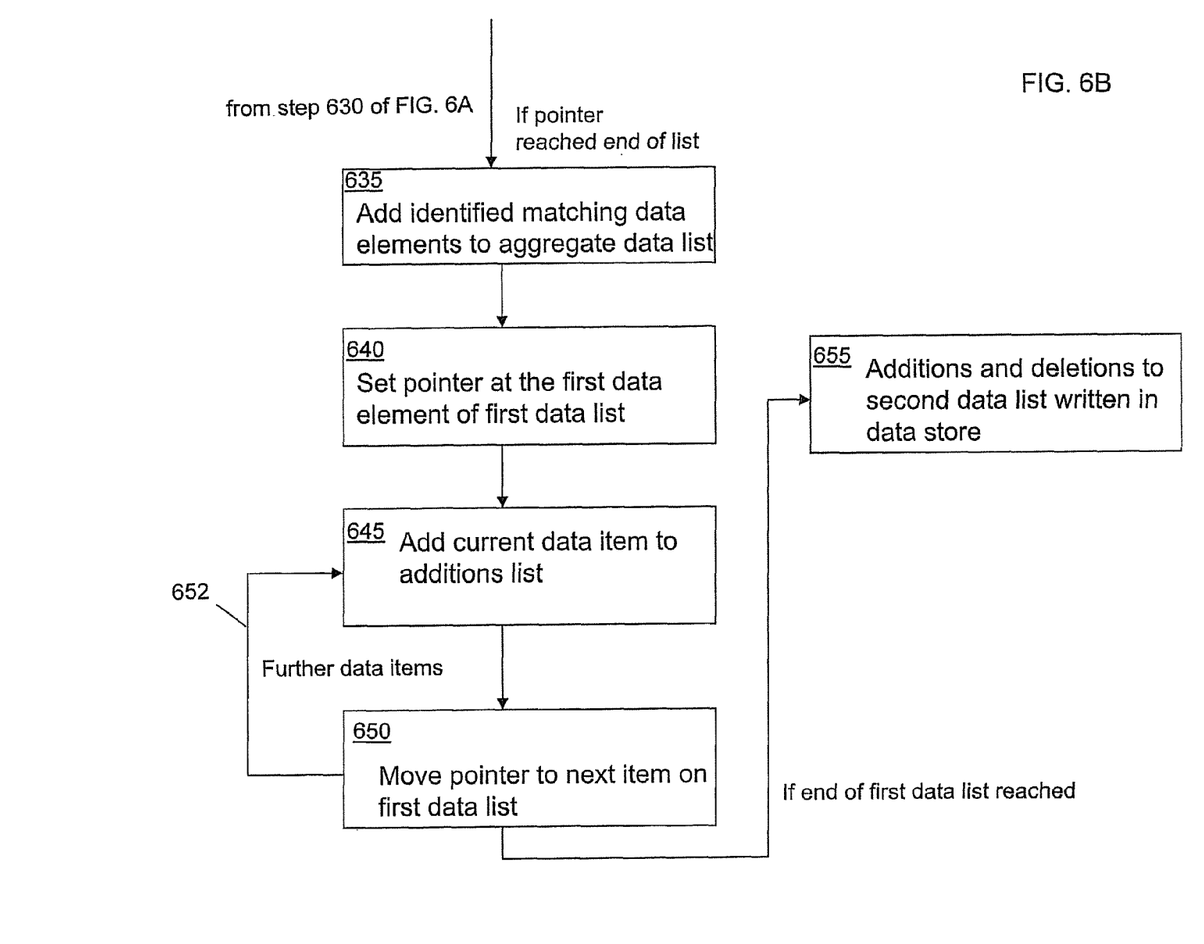
Figure 7:
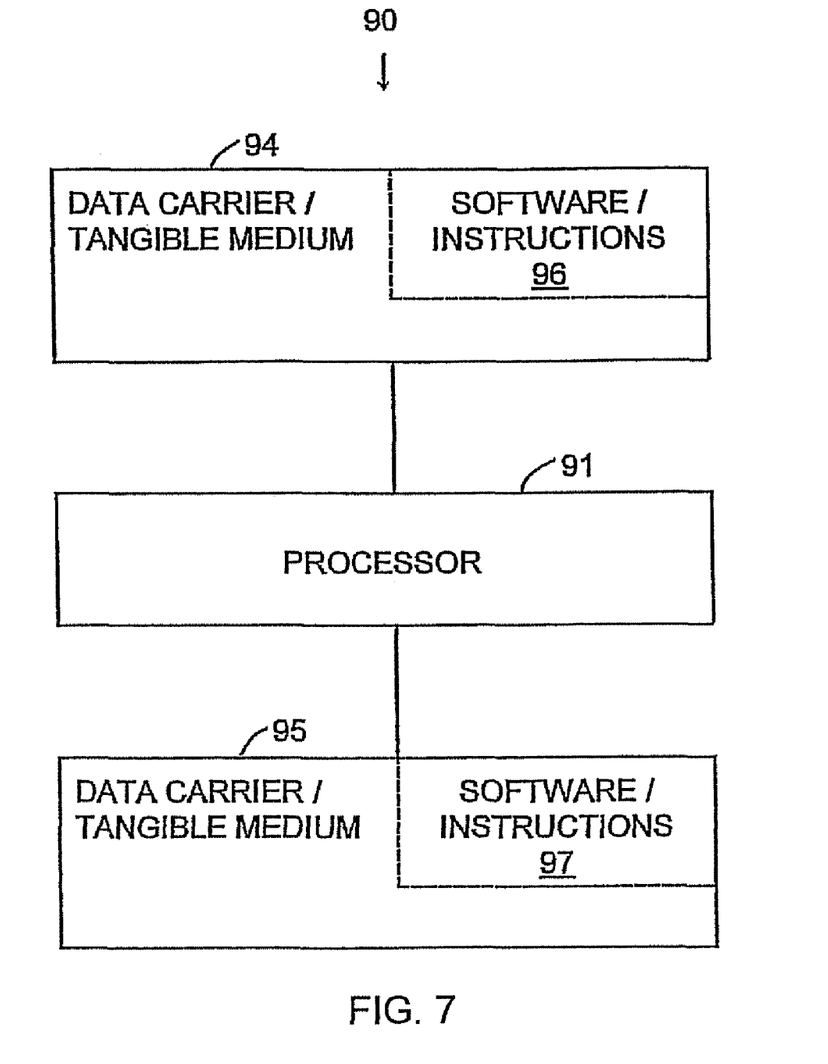
FIG. 7 illustrates a computer system for use with embodiments of the present invention.

The process steps of the aggregator component 315 are explained with reference to FIGS. 6A and 6B (collectively, "FIG. 6"). At step 600, the get data lists component 400 sends a request to the third party application 215 data store 320 and the social network application 205 to request access to the contact list 220 associated with the unique ID that the user registered with the social network application 205.

Next, at step 605, the parse data list component 405 sets a pointer to the first data element '1' in the second data list 510. Then for each data element in the data list 510, the parse data lists component 405 searches for matching data elements in the first data list 500 at step 610. If no matching data element is found, then for each data element that the pointer is currently pointing to, the data element is added to the deletions data list 535 at step 625.

However, if a matching data element is located in the first data list 500, any supplementary information that was supplied by the social networking application 205 and the third party application 215 is aggregated and stored with the associated data element from the first data list 500 at step 615.

At step 620, the identified matching data elements are removed from the first and second data lists and written to an aggregated data list 530 at step 635 after step 630 moves the pointer to the next data element in the second data list 510. This process is continued until all matching data elements have been removed from the lists 510 and 500.

Next, the pointer in the first data list 500 is reset to the first data element at step 640, followed by adding the current data element to the additions list 520 in step 645. The parse data list component 405 determines if there are data elements in the first list which are not listed in the second data list. If a data element is located, then this data element is added to the additions data list 520 at step 645 and step 650 moves the pointer to the next data item in the first data list 500. If there are additional data list to process after step 650 is executed, then the procedure loops back to step 645 as indicated in path 652; otherwise, step 655 is next executed. In step 655, the write component 420 combines the additions list 520 with the aggregated list 530 to generate a new aggregated list 550 in the data store of the third party application 215. In step 655, the removal component 425 deletes those data elements in the deletions list 555 in the data store of the third party application 215 that match the data elements in the deletions data list 535. In the example of FIG. 5, the deletions list 555 is empty after the deletion is performed in step 655.

As seen in FIG. 5, the data elements of the new aggregated list 550 (1, 2, 8, 5, 11) is a concatenation of the data elements in the aggregated list 530 (1, 2, 8) and the data elements in the additions list 520 (5, 11). Moreover, the data elements of the new aggregated list 550) consists of the data elements of the first data list 500, but in a different sequential order which reflects the positional appearance in the first data list 500 of the data elements that are also in second data list 510 and the data elements that are not in the second data list 510.

FIG. 8 illustrates a computer system 90 for use with embodiments of the present invention.

It will be appreciated that the method and arrangement described above may suitably be carried out fully or partially in program code/instructions/software 97 running on one or more processors 91, and that the software may be provided in the form of one or more computer program elements carried on any suitable data-carrier 95 or 94 such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with the computer system 90. Such an implementation may comprise a series of computer-readable program code/instructions/software 96 either fixed on a tangible storage medium, such as a computer readable storage medium 95 or 94, for example, diskette, CD-ROM, ROM, or hard disk, or transmittable to the computer system 90, via a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. A method for determining an updated data source from a first disparate data source and a second disparate data source in a data processing system, said method comprising:
   receiving into a volatile memory a first data list and a second data list associated with the first disparate data source and the second disparate data source, respectively;
   determining all data elements in the first data list that match data elements in the second data list;
   writing into a first aggregation data list in the volatile memory said determined all data elements in the first data list that match data elements in the second data list;
   determining all data elements in the first data list that do not match data elements in the second data list;
   writing into an additions data list in said volatile memory said determined all data elements in the first data list that do not match data elements in the second data list;
   determining all data elements in the second data list that do not match data elements in the first data list;
   writing into a first deletions data list in said volatile memory said determined all data elements in the second data list that do not match data elements in the first data list;
   after said writing into the first aggregation data list, said writing into the additions data list, and said writing into the first deletions data list: writing to a second aggregation data list in a non-volatile memory of a data store all data elements in the first aggregation data list and all data elements in the additions data list; and
   after said writing into the first deletions data list, removing from a second deletions data list stored in the non-volatile memory of the data store, all data elements matching the data elements in the first deletions data list.

2. The method of claim 1, wherein a server comprises a social networking application, a third party application, and the data store, wherein the received first data list and second data list is a copy of a first contact list and a second contact list, respectively, of a user, and wherein the first contact list and the second contact list is respectively comprised by the social networking application and the third party application.

3. The method of claim 2, wherein said method further comprises for a given data element in first aggregation data list and its matching data element in the first and second data lists:
   finding first supplementary data and second supplementary data associated with the matching data element in the first data list and the second data list, respectively, and wherein the and wherein the first supplementary data differs from the second supplementary data;
   storing the first supplementary data and the second supplementary data along with the given data element in the first aggregation data list.

4. The method of claim 3, wherein the first supplementary data and the second supplementary data are each selected from the group consisting of a name of the user, an email address of the user, and a telephone number of the user.

5. The method of claim 1, wherein the data elements in the second aggregation data list consist of the data elements in the first aggregation data list.

6. The method of claim 5, wherein the data elements in the second aggregation data list are in a different sequential order than the data elements in the first aggregation list.

7. The method of claim 1, wherein said removing results in the second deletions data list being empty.

8. A computer system comprising a processor and a computer readable storage medium, said storage medium containing program code configured to be executed by the processor to implement a method for determining an updated data source from a first disparate data source and a second disparate data source in a data processing system, said method comprising:
   receiving into a volatile memory a first data list and a second data list associated with the first disparate data source and the second disparate data source, respectively;
   determining all data elements in the first data list that match data elements in the second data list;

writing into a first aggregation data list in the volatile memory said determined all data elements in the first data list that match data elements in the second data list;

determining all data elements in the first data list that do not match data elements in the second data list;

writing into an additions data list in said volatile memory said determined all data elements in the first data list that do not match data elements in the second data list;

determining all data elements in the second data list that do not match data elements in the first data list;

writing into a first deletions data list in said volatile memory said determined all data elements in the second data list that do not match data elements in the first data list;

after said writing into the first aggregation data list, said writing into the additions data list, and said writing into the first deletions data list: writing to a second aggregation data list in a non-volatile memory of a data store all data elements in the first aggregation data list and all data elements in the additions data list; and after said writing into the first deletions data list, removing from a second deletions data list stored in the non-volatile memory of the data store, all data elements matching the data elements in the first deletions data list.

9. The computer system of claim 8, wherein a server comprises a social networking application, a third party application, and the data store, wherein the received first data list and second data list is a copy of a first contact list and a second contact list, respectively, of a user, and wherein the first contact list and the second contact list is respectively comprised by the social networking application and the third party application.

10. The computer system of claim 9, wherein said method further comprises for a given data element in first aggregation data list and its matching data element in the first and second data lists:

finding first supplementary data and second supplementary data associated with the matching data element in the first data list and the second data list, respectively, and wherein the and wherein the first supplementary data differs from the second supplementary data;

storing the first supplementary data and the second supplementary data along with the given data element in the first aggregation data list.

11. The computer system of claim 10, wherein the first supplementary data and the second supplementary data are each selected from the group consisting of a name of the user, an email address of the user, and a telephone number of the user.

12. The computer system of claim 8, wherein the data elements in the second aggregation data list consist of the data elements in the first aggregation data list.

13. The computer system of claim 12, wherein the data elements in the second aggregation data list are in a different sequential order than the data elements in the first aggregation list.

14. The computer system of claim 8, wherein said removing results in the second deletions data list being empty.

15. A computer program product, comprising a computer readable storage medium having a computer readable program code therein, said computer readable program code comprising an algorithm configured to implement a method for determining an updated data source from a first disparate data source and a second disparate data source in a data processing system, said method comprising:

receiving into a volatile memory a first data list and a second data list associated with the first disparate data source and the second disparate data source, respectively;

determining all data elements in the first data list that match data elements in the second data list;

writing into a first aggregation data list in the volatile memory said determined all data elements in the first data list that match data elements in the second data list;

determining all data elements in the first data list that do not match data elements in the second data list;

writing into an additions data list in said volatile memory said determined all data elements in the first data list that do not match data elements in the second data list;

determining all data elements in the second data list that do not match data elements in the first data list;

writing into a first deletions data list in said volatile memory said determined all data elements in the second data list that do not match data elements in the first data list;

after said writing into the first aggregation data list, said writing into the additions data list, and said writing into the first deletions data list: writing to a second aggregation data list in a non-volatile memory of a data store all data elements in the first aggregation data list and all data elements in the additions data list; and after said writing into the first deletions data list, removing from a second deletions data list stored in the non-volatile memory of the data store, all data elements matching the data elements in the first deletions data list.

16. The computer program product of claim 15, wherein a server comprises a social networking application, a third party application, and the data store, wherein the received first data list and second data list is a copy of a first contact list and a second contact list, respectively, of a user, and wherein the first contact list and the second contact list is respectively comprised by the social networking application and the third party application.

17. The computer program product of claim 16, wherein said method further comprises for a given data element in first aggregation data list and its matching data element in the first and second data lists:

finding first supplementary data and second supplementary data associated with the matching data element in the first data list and the second data list, respectively, and wherein the and wherein the first supplementary data differs from the second supplementary data;

storing the first supplementary data and the second supplementary data along with the given data element in the first aggregation data list.

18. The computer program product of claim 17, wherein the first supplementary data and the second supplementary data are each selected from the group consisting of a name of the user, an email address of the user, and a telephone number of the user.

19. The computer program product of claim 15, wherein the data elements in the second aggregation data list consist of the data elements in the first aggregation data list.

20. The computer program product of claim 19, wherein the data elements in the second aggregation data list are in a different sequential order than the data elements in the first aggregation list.

* * * * *